United States Patent [19]

Umino et al.

[11] 4,412,852
[45] Nov. 1, 1983

[54] APPARATUS FOR PRODUCING BRICK-SHAPED BLOCKS OF DRY ICE

[76] Inventors: Naotake Umino, 1962-3 OOno, Ichikawashi, Chibaken; Tatsuo Fukuda, 5-23-405 Takesato Danchi, 6-118 Ooaza Ooeda, Asukabeshi, Saitamaken, both of Japan

[21] Appl. No.: 330,497

[22] Filed: Dec. 14, 1981

[51] Int. Cl.³ ............................................. F25J 1/00
[52] U.S. Cl. ........................................ 62/35; 62/341
[58] Field of Search ........................... 62/35, 341, 10; 100/215, 240, 246–249, 251

[56] References Cited

U.S. PATENT DOCUMENTS 2,043,366  6/1936  Bech ................................. 100/251
2,253,880  8/1941  Zieber ................................. 62/35

Primary Examiner—Frank Sever
Attorney, Agent, or Firm—Francis D. Thomas, Jr.; Francis B. Francois

[57] ABSTRACT

An apparatus for producing dry ice blocks includes an upper, charging mold having an outlet opening in its lower end and positioned in spaced relationship above a lower, press mold having an inlet opening in its upper end. The charging mold contains a slidable precompression piston and the press mold has a slidable press piston, the two pistons respectively being connected to actuators. A shutter assembly is positioned between the two openings, and includes a shutter having a forward extension which defines a recess therebeneath. The shutter is moved forwardly and backwardly by actuator means from a position wherein both openings are closed, to a position wherein, both openings are open, to a position wherein only the outlet opening is closed. Thereafter, the press piston forms the charge into a block of dry ice. The shutter is then shifted to the outlet only closed position, and the press piston elevates the block into the recess. Finally, the shutter is returned to its fully closed position, and at the same time moves the dry ice block away from the apparatus to a transfer means.

12 Claims, 8 Drawing Figures

APPARATUS FOR PRODUCING BRICK-SHAPED BLOCKS OF DRY ICE

BACKGROUND OF THE INVENTION

1. Technical Field of the Invention

The present invention relates generally to apparatus for producing blocks of dry ice from liquid carbod dioxide. More particularly, it relates to an improved apparatus which will rapidly and continuously produce brick-shaped blocks of dry ice, and which is designed to be especially useful for restaurants, ice cream shops, confectionaries, and the like.

2. Description of the Prior Art

The basic process for making block dry ice from liquid carbon dioxide has long been known, and involves first spraying the liquid carbon dioxide into a chamber to form dry ice snow, and then compressing the snow into a block. Over the years various kinds of apparatus for carrying out this basic process have been devised, and typical of such conventional apparatus is that which is the subject of Great Britain Complete Specification No. 433,018, accepted Aug. 7, 1935. Referring to the drawings of the present application, FIGS. 7 and 8 illustrate the prior art as described in this British patent.

As shown in said FIGS. 7 and 8, a charging cylinder 50 is provided with an inlet nozzle 51 at its upper end, and is positioned vertically above a vertically movable press cylinder 53. A transversely movable shutter 52 is positioned between the cylinders 50 and 53, and is operable by a hydraulic actuator 54. The press cylinder 53 carries an annular piston 58 thereon that is slidable within a cylinder 58a, and which is moved toward and away from the shutter assembly by hydraulic pressure. A press plunger 55 is mounted for vertical movement within the press cylinder 53, and carries a piston 56 on its lower end that is received within a cylinder 56a and which is operable by hydraulic pressure to raise and lower the press plunger 55.

Liquid carbon dioxide is sprayed into the charging cylinder 50 through the inlet nozzle 51, with the shutter 52 in a closed position. As the carbon dioxide is sprayed from the nozzle 51 it changes to dry ice snow through adiabatic expansion. and accumulates in the charging cylinder. When a sufficient quantity of dry ice snow has been formed the shutter 52 is opened by the hydraulic actuator 54, and the snow then falls by gravity into the lower, press cylinder 53, which has been elevated so that its upper end is in contact with the shutter assembly. The shutter 52 is then closed and the press plunger 55 is elevated by hydraulic pressure, to form a block of solid dry ice 57 from the snow. White the press plunger 55 is operating, the charging cylinder 50 is again sprayed with liquid carbon dioxide to form the next charge of dry ice snow for the press cylinder 53.

After the block 57 has been formed the press cylinder 53 is lowered while the press plunger 55 remains elevated, until the respective components reach the relationship shown in FIG. 8, wherein the block 57 of dry ice has been pushed from the cylinder 53 and stands exposed on the press plunger 55. The block 57 is then removed, and the apparatus is ready for another cycle.

While the apparatus of the noted British patent can successfully produce cylindrical blocks of dry ice, it is not fully satisfactory for all applications, especially in those instances where considerable quantities of brick-shaped dry ice need to be produced in minimum time, with a minimum of labor. Among the problems with such prior apparatus are the following:

1. As will be noted from the brief description given of the apparatus of the British patent, the press cylinder 53 must be vertically movable and must be repeatedly driven up and down by hydraulic pressure to provide for removal of the formed dry ice block 57. This requires a rather complicated and expensive mechanical structure which must be maintained, and which is subject to wear and breakdown.
2. In order to provide for automatic operation of the device of the British patent, transferring means must be added thereto to automatically remove the dry ice block 57 after the press cylinder 53 has been lowered. Any such transferring means must be of a rather complicated esign, so as not to interfere with the raising and lowering of the press cylinder 53.
3. Because the dry ice snow supplied into the press cylinder 53 from the charging cylinder 51 in the apparatus of the British patent must have a low density, it is necessary to have a lengthy press cylinder 53 in order to produce large blocks of solid dry ice. This means that the press cylinder 53 and the hydraulic actuator 56 must both have lengthy strokes, which increases the size of the apparatus and hence its cost.
4. During compression of the dry ice snow in the press cylinder 53 of the apparatus described in the British patent, any gaseous carbon dioxide contained in the snow will be shut in the solid dry ice block 57. This trapping of gaseous carbon dioxide is undesirable in that it affects the speed and quality of the pressing operation, and results in dry ice of a quality that is uneven and which is prone to early cracking and breakup.
5. In order to operate the device of the British patent continuously, two shutters must be installed. Further, continuous operation of the device in the British patent will result in some of the dry ice snow adhering to the walls of the charging cylinder 51 and remaining therein, which makes it difficult to constantly produce solid dry ice blocks of uniform size and weight.

There is need for an apparatus for making brick-shaped blocks of dry ice from liquid carbon dioxide that minimizes the size of the equipment, requires a minimum of moving elements, controls the problem of trapping gaseous carbon dioxide in the dry ice, and which can repeatedly and rapidly produce dry ice blocks of high quality and substantially uniform characteristics. The apparatus of the present invention is intended to fulfill that need.

SUMMARY OF THE INVENTION

The apparatus of the present invention includes an upper, charging mold positioned above a lower, press mold, the two molds being separated by a shutter assembly that includes a transversely movable shutter member. Unlike in the apparatus described hereinabove, both of the molds in the present invention are fixed in position within a frame, and need not be moved vertically during the manufacture of dry ice blocks. The lower end of the upper mold has an outlet opening and the upper end of the lower mold has an inlet opening, and these two openings are opened or closed by forward and rearward movements of the shutter member.

The upper, charging mold has nozzle means at its upper end for spraying liquid carbon dioxide into the mold to form dry ice snow. A precompressing piston is slidably mounted in the upper, charging mold, and normally rests in an elevated position above the nozzle means. After the desired quantity of dry ice snow has been formed in the charging mold, and with the shutter member in a closed position, the precompressing piston is driven downwardly by a hydraulic actuator to precompress the dry ice snow into a loosely compacted charge block. Carbon dioxide gas released during this precompression step can escape the charging mold through discharge ports provided in the upper end thereof, and in addition the shutter member and the lower portion of the charging mold are preferably made from a porous metal that will allow trapped carbon dioxide gas under pressure to escape therethrough.

After the dry ice snow has been precompressed into a charge block, the shutter assembly is opened and the precompressed charge block enters the lower, press mold. The precompressing piston is preferably designed to be movable downwardly, to assist movement of the precompressed charge block of dry ice snow into the press mold. The shutter assembly then moves into a position closing the upper end of the press mold, and a press piston contained within the press mold is moved upwardly by a hydraulic actuator to form a brick-shaped block of dry ice from the charge.

The shutter assembly includes a shutter that is utilized to close off the opening between the two molds, and a shutter extension that projects forwardly from the shutter. The upper surfaces of the shutter and the shutter extension are continuous, but the undersurface of the extension is recessed and open at the front. The hydraulic actuator arrangement for moving the shutter and the shutter extension is effective to shift the assembly to three different positions. In a first, shut-down position, the shutter assembly is fully advanced and completely closes both the outlet of the upper mold and the inlet of the lower mold. This position is utilized for both the precompression and the final compression steps. In the second, or full open position, both the shutter and the shutter extension are fully retracted and are free of the inlet and outlet openings, so that the two molds are in full communication. Finally, in an intermediate, inlet open position, the shutter assembly is moved so that the shutter extension closes the outlet opening of the upper mold, but the recess thereunder is open to the inlet opening of the lower mold.

In operation, the shutter assembly is moved into the inlet open position after the final compression step is complete in the lower mold, and the press piston is then operated to elevate the brick-shaped block of dry ice into the shutter recess. The shutter assembly is then operated to move it into the fully advanced shut-down position, and in the process the shutter is effective to remove the just produced block of dry ice away from the apparatus and onto a transfer mechanism. Thus, automatic operation of the apparatus is achieved.

The apparatus of the present invention offers several advantages over prior machines for producing blocks of dry ice, including the following:

1. By utilizing the shutter assembly, in cooperation with the press piston, to automatically remove the just produced block of dry ice from the apparatus, the need to have one or more movable molds of the type shown in the cited British patent is eliminated. Instead, the molds can be fixed to a supporting frame, and the whole apparatus is mechanically less complicated and expensive.

2. By precompressing the dry ice snow in the upper mold, certain advantages are obtained. First, because the charge block entering the lower mold has already been partially compressed, the stroke distance of the press piston and the overall length of the lower, press mold can be considerably shorter than in apparatus like that shown in the British patent. This reduces the overall height of the apparatus and its weight, making the resultant machine less expensive and more adaptable to different work locations. Secondly, utilization of the precompressing piston to move the precompressed charge block of dry ice snow into the lower mold removes effectively all of the dry ice snow from the upper mold, which helps assure the uniform production of the brick-shaped blocks of dry ice. Third, the precompressing action and the dropping of the precompressed charge into the lower mold helps the escape of carbon dioxide gas, thus improving the efficiency of the final compression step and the quality of the resultant dry ice blocks.

3. The use of a breathing, porous material for the shutter and portions of the molds allows the escape of carbon dioxide gas to occur during the two compressing steps, which reduces the required capacity of the hydraulic actuators, improves the overall efficiency of the apparatus, and improves the quality of the produced dry ice blocks.

It is the principle object of the present invention to provide apparatus for making brick-shaped blocks of dry ice of high quality, in an automatic manner and with a minimum of expense and labor.

Another object is to provide an apparatus for making dry ice blocks from carbon dioxide gas, wherein normally trapped carbon dioxide gas is allowed to escape from the compressed dry ice snow so as to improve the efficiency of the apparatus and the quality of the resultant dry ice.

A further object of the invention is to provide an apparatus for making dry ice blocks from carbon dioxide gas wherein two molds are provided, and which is designed so that both molds can be mounted stationary upon a supporting frame.

Yet another object of the invention is to provide an apparatus for making dry ice blocks that is of minimum height and weight, and which is economical to construct and maintain.

Other objects and many of the attendant advantages of the present invention will become readily apparent from the following Description of the Preferred Embodiments, when taken in conjunction with the attached drawings.

DETAILED DESCRIPTION OF THE PREFERRED EMBODIMENTS

Figure 1:
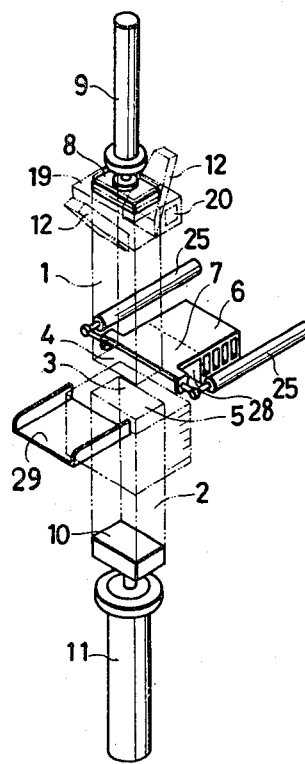
FIG. 1 is an exploded perspective view of key components of the apparatus of the present invention, with some of the components being shown in phantom lines, and illustrates the basic relationship of those key components to each other.
Figure 2:
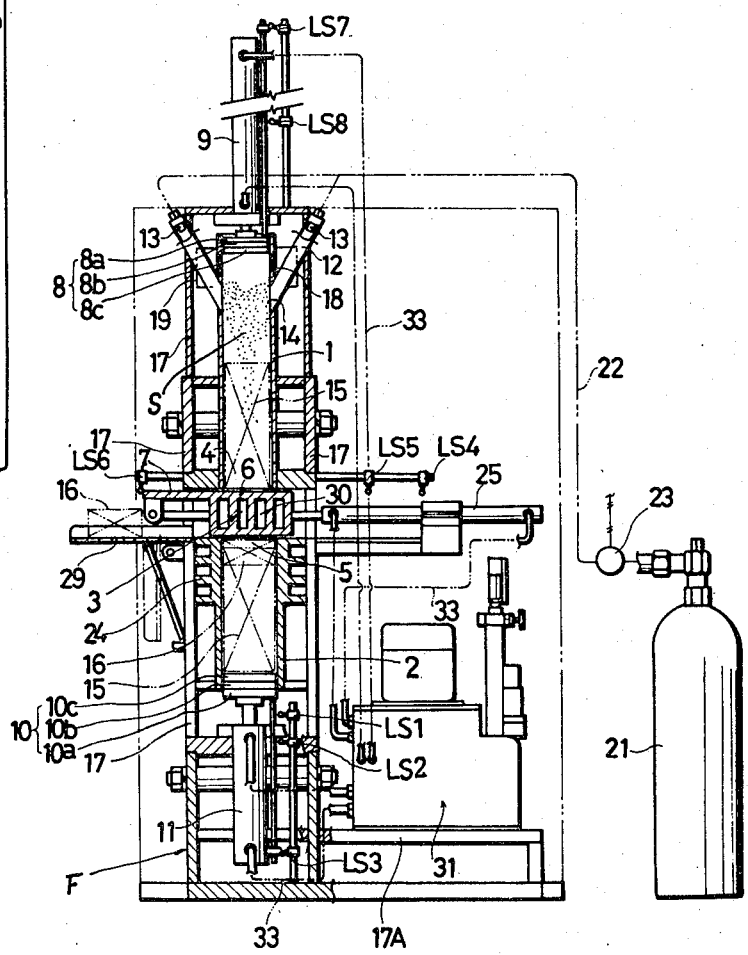
FIG. 2 is side elevational view of the apparatus of the invention, partly in section, and with some components partially broken away to show the construction thereof.
Figure 3:
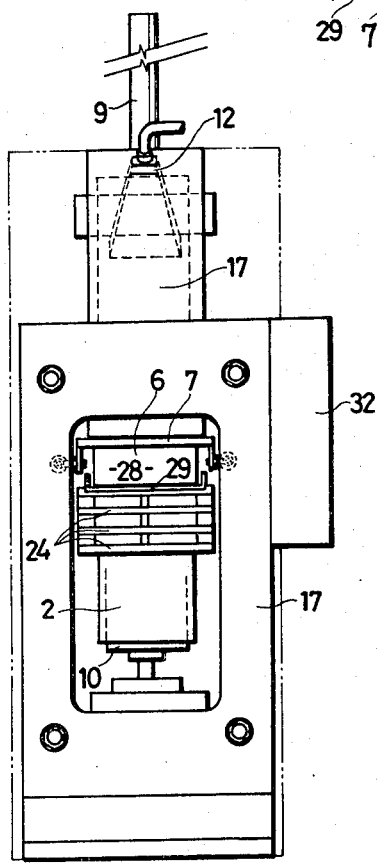
FIG. 3 is a front elevational view of the apparatus of FIG. 2.

Referring now in particular to FIGS. 1-3 of the drawings, the present apparatus includes an upper, charging mold 1 and a lower, press mold 2 disposed in vertical alignment, the two molds 1 and 2 being separated by a shutter space 3 and being secured to a machine frame F that includes as its main components a pair of spaced vertical plates 17. The upper mold 1 has an outlet opening 4 at the lower end thereof, and the lower mold 2 has an inlet opening 5 at its upper end, both openings facing the shutter space 3 and being in alignment with each other.

A shutter 6 is mounted for forward and backward horizontal movement in the shutter space 3, and is connected to hydraulic actuators 25 that are in turn attached to the frame F. The shutter 6 has an extension 7 on the front edge thereof, the top surfaces of the shutter 6 and the extension 7 presenting a continuous surface, and a recess being formed beneath the extension 7 and the front face 28 of the shutter 6, the recess being open on the front and bottom thereof.

A precompression piston 8 is slidably received within the upper, charging mold 1, and is connected with the shaft of a hydraulic actuator 9 that is attached to the frame F. The lower, press mold slidably receives a press piston 10, connected to the shaft of a hydraulic actuator 11 that is effective to raise and lower the press piston. Mounted on opposite sides of the rectangular upper, charging mold 1 are charging ducts 12, the outlets 14 of the ducts 12 being positioned below the upper end of the mold so that the precompression piston 8 can be moved to a position thereabove.

A shown in FIG. 2, the charging ducts 12 are arranged at an oblique angle relative to the vertical axis of the upper mold 1, and each duct opens at it lower end 14 into the charging mold. As best shown in FIG. 3, the sidewalls of the rectangular in cross-section charging ducts 12 taper outwardly from top to bottom, so that they have a continuously increasing cross-section in this direction. An injection nozzle 13 is positioned at the upper end of each charging duct 12, and is utilized to spray or jet liquid carbon dioxide into the charging mold 1 to form dry ice snow.

In operation, liquid carbon dioxide is sprayed into the upper mold 1, until the desired quantity of dry ice snow S has been created. During this step, the actuators 25 maintain the shutter 6 in a position wherein the outlet 4 is closed. Once the desired amount of dry ice snow S has accumulated, the hydraulic actuator 9 is activated to lower the precompression piston 8, which is effective to shape the snow into a charge block 15. The actuators 25 are then actuated to move the shutter 6 and its extension 7 to the fully retracted position wherein both the inlet 5 and the outlet 4 are open, and the charge block 15 can then move by gravity into the lower, press mold 2. Preferably, the precompression piston 8 is further moved downwardly by the hydraulic actuator 9 to forcefully eject the charge block 15 from the upper mold 1, the piston 8 also then being effective to remove essentially all the dry ice snow from the upper charging mold.

After the charge block 15 has been placed in the lower, press mold 2, the actuators 25 are utilized to move the shutter 6 into the fully closed position of FIG. 2. The hydraulic actuator 11 is then activated to elevate the press piston 10, which forms the charge 15 of the dry ice snow into a brick-shaped block 16 of dry ice, the rectangular section of the mold 2 assuring the brick-shape. When the block 16 has been formed, the actuators 25 are again activated, this time to shift the shutter 6 to the right in FIG. 2 so that the recess under the extension 7 is placed over the mold inlet 5.

The hydraulic actuator 11 is then further activated, so that the press piston 10 elevates to where the top surface thereof is level with the upper end of the press mold 2. This places the block 16 within the access, and in alignment with a transfer mechanism 29 attached to the frame F. The shutter actuators 25 are then activated to move the shutter 6 to the left in FIG. 2, so that the front surface 28 of the shutter 6 is effective to transfer the completed block 16 of dry ice onto the transfer mechanism 29; during all this time, the continuous upper surfaces of the shutter 6 and the extension 7 have been effective to seal the lower end outlet opening 4 of the upper, charging mold 1, so that the next accumulation of dry ice snow in the mold 1 can occur.

When the next charge block 15 of dry ice snow has been prepared, the shutter assembly is again shifted into its open position, to allow the charge 15 to enter the lower, press mold 2. Thus, a full cycle of operation of the apparatus is completed.

The charging mold 1 and the press mold 2, as has been noted, both have rectangular cross-sections, and the upper mold 1 is preferably made of stainless steel. The mold 1 has a plurality of carbon dioxide vent holes 18 formed therein above the duct openings 14, and the outlets of these vent holes 18 open into a discharge duct 19 that encircles the mold 1 and has a discharge outlet 20. The spray nozzles 13 are designed so as to produce dry ice snow with adiabatic expansion when liquid carbon dioxide is jetted therethrough, and are connected with a liquid carbon dioxide bottle 21 by a conduit 22 and a remotely controlled valve 23.

The lower, press mold 2 is also preferably constructed of stainless steel, and is provided with reinforcing stiffeners 24 on the exterior of its upper end that also serve as heat absorbing fins. Because toward the end of final compression of the charge into dry ice the dry ice snow is pressed with a high pressure of approximately 150 kg/cm$^2$, the upper end of the press mold 2 needs to be strong and should be reinforced. The reinforcing fin stiffeners 24 serve this purpose.

Further, when the outer circumferential surface of the produced dry ice block 16 has been formed, it will tend to stick by freezing to the inner surface of the press mold 2, making it difficult for the press piston 10 to move it into the recess beneath the shutter extension 7. The reinforcing fin stiffeners 24 alleviate this problem, by absorbing external heat which is then applied to the lower mold 2 to warm the inner surface thereof and break down any freezing-sticking action. It is also preferable that the internal surface of the lower, press mold 2 be smooth and uninterupted, again in part to alleviate any possible freezing-sticking problem.

Figure 4:
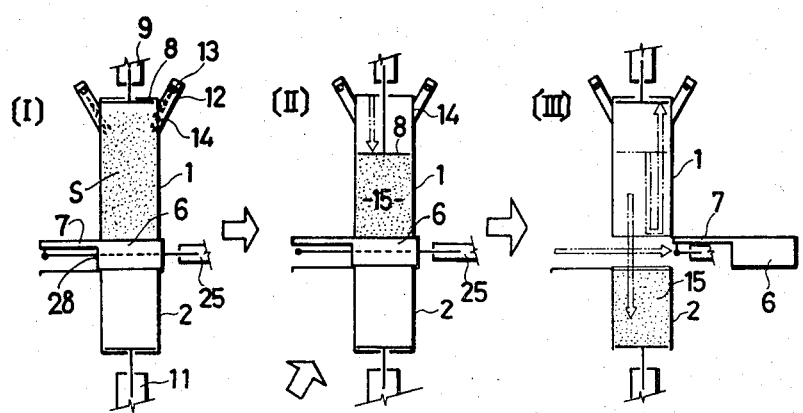
FIG. 4 is an explanatory schematic view illustrating the production steps for making dry ice blocks with the present apparatus, and includes steps I through V, connected by flow arrows.

Referring now to the diagramatic presentation of FIG. 4, the operating cycle of the apparatus of the invention is illustrated therein. In FIG. 4(I), the shutter 6 has been placed in its fully advanced, full shutdown position, with both the outlet 4 and the inlet 5 closed. Further, the precompression piston 8 has been elevated to its withdrawn position, above the duct openings 14 and the ports 18. Liquid carbon dioxide is then sprayed into the charging mold 1, to form dry ice snow S.

Moving now to FIG. 4 (II), after the desired quantity of dry ice snow S has been formed in the charging mold 1, flow from the nozzles 14 is terminated, and the hydraulic actuator 9 is actuated to move the precompression piston 8 downwardly to form the precompressed charge 15 of dry ice snow. Then, as shown in FIG. 4 (III), the shutter 6 and the shutter extension 7 are fully retracted to their fully open position, and the precompressed charge of dry ice snow 15 is dropped into the press mold 2, with assistance from further lowering of the precompression piston 8.

Moving now to FIG. 4 (IV), after the charge 15 is in place in the lower, press mold 2, the shutter 6 is advanced to its fully forward position so that both the outlet 4 and the inlet 5 are closed thereby. The press piston 10 is then moved upwardly by the hydraulic actuator 11, to form a brick-shaped block 16 of dry ice. In parallel with this step, the charging mold 1 is again supplied with liquid carbon dioxide through the nozzles 13, to form another volume of dry ice snow S therein.

Figure 5:
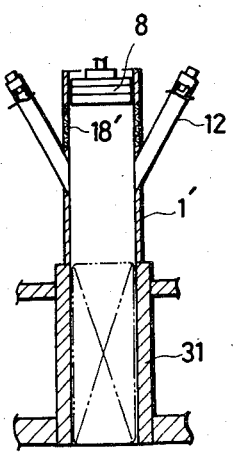
FIG. 5 is an enlarged, elevational view of a modified upper mold, wherein the lower portion of the mold is made from a porous metal to facilitate the escape of carbon dioxide gas.

Finally, as shown in FIG. 5 (V), after formation of the dry ice block 16 is complete the shutter 6 is partially retracted to place the shutter extension 7 over the outlet opening 4, and to position the recess formed under the extension 7 over the inlet opening 5. The brick-shaped dry ice block 16 is then moved upwardly into the recess by further activation of the press piston 10, and then the shutter assembly is further advance to its original position, which action places the block 16 on the transferring mechanism 29. When the charging chamber has been sufficiently filled with dry ice snow S, the cycle then begins anew, and is repeated to continuously produce brick-shaped dry ice blocks of uniform characteristics, each cycle taking but a few minutes of time.

As has been mentioned, it is preferable to vent any carbon dioxide gas remaining in the dry ice snow S. The vent ports 18 enable considerable such venting to occur, but there remains the problem of gas trapped within the charge 15 under the precompressing piston 8. To allow for the escape of such trapped carbon dioxide gas, the shutter 6 is constructed of sintering metal having the property of being relatively porous to the passage of gas, such metals being commercially available. The interior of the shutter 6 is formed with vent passages 30, to convey away carbon dioxide gas that is passed thereinto by the porous metal. With this arrangement, the dry ice snow can be efficiently precompressed into a charge 15 without undue interference from carbon dioxide gases present therein, and the resultant dry ice blocks 16 will have a more uniform high density and quality.

To further allow for the escape of carbon dioxide gas, a modification of the upper, charging mold is shown at 1' in FIG. 5. The lower portion 31 of the mold 1' is constructed from the same type of sintering, porous metal as the shutter 6, and thus also allows for escape of trapped gas. The mold 1' has ports 18' in its upper end, like those utilized on the mold 1. It is also to be understood that the upper end of the lower, press mold can be constructed of such porous metal, if desired, to further enhance the removal of trapped carbon dioxide gas. No drawing FIG. is shown for this embodiment, since it would appear very similar to the arrangement of FIG. 5.

The adiabatic processes in the present invention can create problems with the materials, and the invention takes this into account. It will be noted that the precompressing piston 8 and the press piston 10 are in almost continual contact with dry ice snow, which has a temperature of about $-70°$ C. If this temperature or even one considerably above this leverl is transmitted to other components of the apparatus, for example, the hydraulic actuators, problems can occur.

If the hydraulic oil is cooled substantially, its viscosity increases and hydraulic power devices using the oil will lose some of their power output capability. On the other hand, if there is thermal transmission from the hydraulic cylinders to the precompression piston 8 or the press piston 10, heat may cause some of the dry ice snow to sublimate into carbon dioxide gas.

To overcome these problems, the pistons 8 and 10 are connected to the rods of their respective actuators so as to minimize the transmission of heat. Referring now to FIG. 2, the precompression piston 8 comprises a base plate 8a, an adiabatic plate 8b formed from some adiabatic FRP material, and a face plate 8c. Similarly, the press piston 10 includes a base plate 10a, an adiabatic plate 10b, and a face plate 10c. The presence of the adiabatic plates 8b and 10b greatly alleviates heat transfer problems, and preferably a similar arrangement is utilized to isolate the shutter 6 from its hydraulic actuators 25.

The hydraulic system for the apparatus includes a hydraulic power device 31 for supplying pressurized oil to the actuators 9, 11 and 25, the device 31 including an oil tank, a hydraulic pump, an electric motor, and suitable control valves and switching devices, all of conventional design. The device 31 is installed on a portion 17a of the supporting frame F, to the rear of the press mold 2.

A control box 32 is provided for the apparatus, and is mounted on the front side of the supporting frame F. The control box 32 contains sequence control circuits for controlling the actuators 8, 11 and 25, there directional control solenoid valves that control flow in conduits 33 that are connected with the actuators, and by controlling the solenoid valve 23 in the liquid carbon dioxide conduit 22. The control circuit is of conventional design, and hence will not be described in detail herein. However, an explanation of the control sequence will now be given in connection with the schematic drawing of FIG. 6.

The control circuit includes a number of limit switches, all of which perform their usual function. The press actuator 11 is provided with limit switches LS1, LS2 and LS3 for detecting the upper position, the pressing limit position and the lower position of the press piston 10, respectively. Similarly, the precompression actuator 9 is provided with limit switches LS7 and LS8 for detecting the retracted or standing by the dropping or lowered positions of the precompression piston 8, respectively. The shutter assembly actuator 25 is provided with limit switches LS4, LS5 and LS6 for detecting the fully open, inlet open, and shutdown positions of the shutter 6 and the shutter extension 7, respectively.

Figure 6:
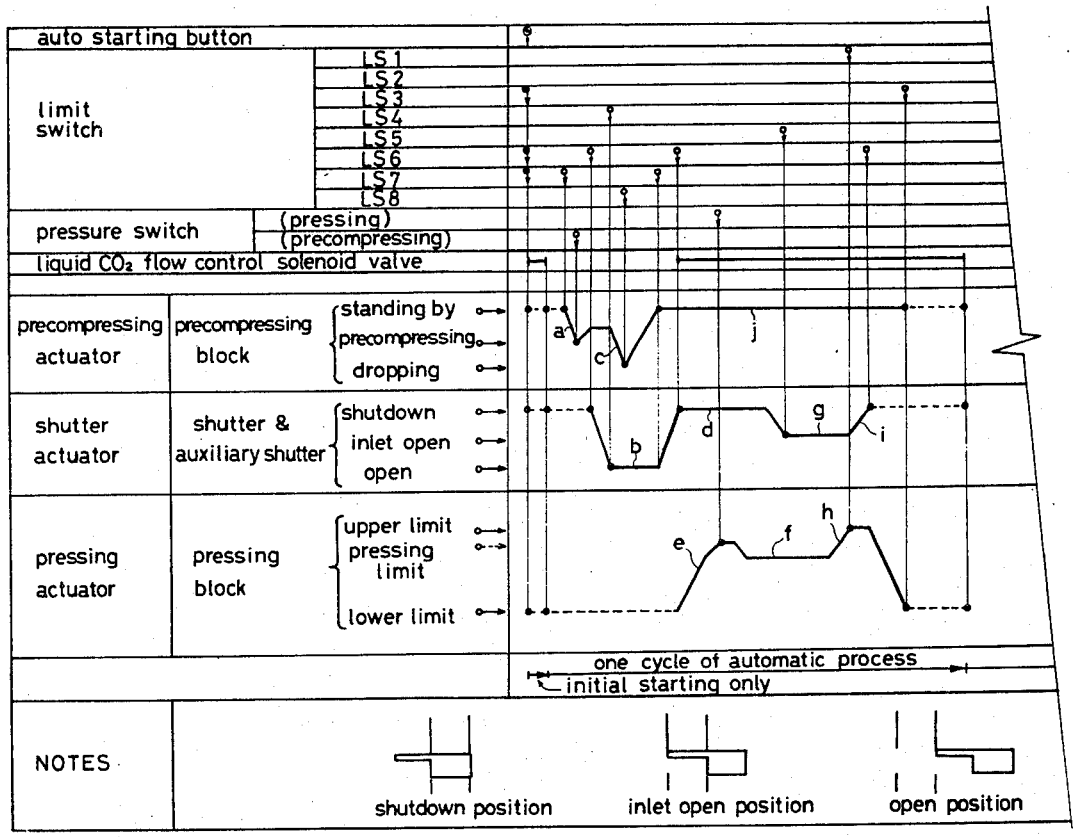
FIG. 6 is a schematic diagram illustrating the operating sequence of the components of the invention, including the various hydraulic actuators and switches that cooperate to provide automatic operation.
Figure 7:
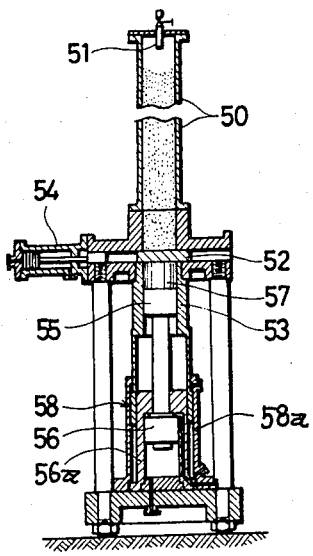
FIG. 7 is an elevational view of the prior art device discussed earlier herein, showing the apparatus in a stage where a dry ice block has just been compressed.
Figure 8:
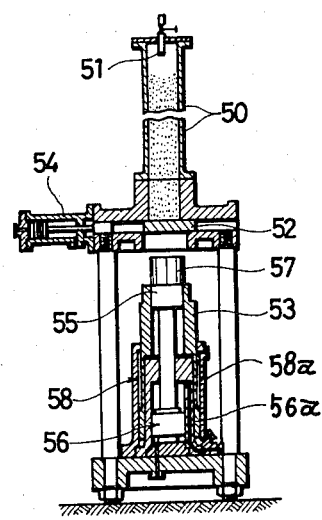
FIG. 8 is a further elevational view of the prior art device of FIG. 7, showing the apparatus with the press cylinder lowered for removal of the completed dry ice block.

Referring now to FIG. 6 at the start of a cycle the starting button of the control box 32 is pressed, and the first occurrence is that the flow control solenoid valve 23 on the liquid carbon dioxide conduit 22 is opened to begin the formation of dry ice snow in the upper, charging mold 11. The control circuit then actuates components in a timed sequence, controlled by the circuit in the usual manner.

The actuator 9 is activated to begin lowering of the precompression piston 8 to precompress the dry ice snow and form the charge block 15, as indicated by the reference character a in FIG. 6, and after the shutter 6 and the shutter extension 7 are changed to their fully open position, as indicated in the FIG. by the character b, the charge 15 is dropped into the press mold 2, as indicated by the character c.

Then, after the shutter 6 has been moved to its shutdown position, as indicated by the reference character d in FIG. 6, the charge 15 is pressed to form the block 16 to dry ice by activating the actuator 11 and elevating the press piston 10, as shown by the reference character e. Then, during holding of the dry ice block 16 in a standby position, as shown by the reference character f, the shutter 6 and the shutter extension 7 are changed to their inlet open positions, indicated by reference character g, after which the solid dry ice block 16 is elevated into the shutter recess, as indicated by the reference character h of FIG. 6.

During movement of the shutter 6 to its shutdown position, the dry ice block 16 is pushed forward by the pushing face 28 of the shutter, as shown by the reference character i. In parallel with the process steps e through i, the liquid carbon dioxide for forming the next charge 15 is supplied into the changing mold 1, by keeping open the solenoid valve 23.

Obviously, many modifications and variations of the present invention are possible.

We claim:

1. An apparatus for producing blocks of dry ice from liquid carbon dioxide, comprising:
    a supporting frame;
    an upper, charging mold mounted on said supporting frame and having an outlet at the lower end thereof;
    a lower, press mold mounted on said supporting frame beneath said charging mold and spaced therefrom, said press mold having an inlet opening at the upper end thereof in alignment with said outlet opening;
    a press piston slidably mounted within said press mold;
    actuator means connected with said press piston, and operable to move it between lowered and elevated positions;
    nozzle means mounted near the upper end of said charging mold, and arranged to inject liquid carbon dioxide into said charging mold to form dry ice snow;
    transfer means mounted to confront the space between said upper and said lower molds; and
    shutter means carried by said supporting frame and received in the space between said upper and said lower molds, said shutter means including:
    a shutter having an extension projecting forwardly from the front, top edge thereof, the top surfaces of said shutter and said extension being continuous, and said extension and the front face of said shutter defining a recess that is open at the bottom and front thereof; and
    actuator means arranged to move said shutter forwardly and backwardly between a fully closed position, wherein said shutter closes both said outlet and said inlet, an outlet closed position, wherein said charging mold outlet is closed by said extension and said recess is positioned over said press mold inlet, and a fully open position wherein both said inlet and said outlet are open and in communication with each other,
    whereby dry ice snow is accumulated in said charging mold while said shutter is in said fully closed and said outlet closed positions, and is passed as a charge into said lower, press chamber when said shutter is in said fully open position;
    said press piston and said press actuator means being effective to compress said dry ice snow charge into a block of dry ice when said shutter is in said fully closed position, and being further effective to elevate said block of dry ice and place it in said recess when said shutter is in said outlet closed position; and
    said shutter and said shutter actuator means being effective to transport said dry ice block to said transfer means when said shutter is thereafter moved from said outlet closed position to said fully closed position.

2. An apparatus as recited in claim 1, including additionally:
    a precompression piston slidably mounted within said charging mold; and
    actuator means connected with said precompression piston, and operable to move it between elevated and lowered positions;
    said precompression piston being positioned above said nozzle means when in its fully elevated position, and being lowered after said charging chamber contains a sufficient quantity of dry ice snow to compress said snow into a charge block; and
    said precompression piston and said precompression actuator means being arranged to move to a lowermost position when said shutter is in said fully open position, whereby to move said charge block into said press chamber.

3. Apparatus as recited in claim 2, wherein said press actuator means comprises a hydraulic cylinder placed beneath said press piston, said shutter actuator means comprises at least one hydraulic cylinder placed horizontally behind said shutter, and said precompression actuator means comprises a hydraulic cylinder placed above said precompression piston.

4. Apparatus as recited in claim 3, including additionally means incorporated between said press piston, said shutter and said precompression piston components and their respective hydraulic actuators, effective to minimize the transfer of heat between said components and said actuators.

5. Apparatus as recited in claim 1, wherein said charging mold and said press mold both have a rectangular cross-section, whereby to produce brick-shaped blocks of dry ice.

6. Apparatus as recited in claim 1, including additionally:
a plurality of reinforcing, fin-like stiffeners formed on the exterior of the upper end of said press mold.

7. Apparatus as recited in claim 1, wherein the upper interior portion of said press mold is formed with a smooth and essentially unbroken surface, whereby to facilitate the release of a dry ice block therefrom.

8. Apparatus as recited in claim 1, wherein said shutter is made from a material that is porous and allows the passage of carbon dioxide gas under pressure therethrough.

9. Apparatus as recited in claim 8, wherein the lower end of said charging chamber is made of the same porous material as said shutter.

10. Apparatus as recited in claim 1, wherein the portion of said charging mold above said nozzle means has port means therethrough for the escape of carbon dioxide gas from the interior or said mold.

11. Apparatus as recited in claim 1, wherein said nozzle means includes:
a pair of ducts mounted on opposite sides of said charging mold, said ducts extending at an oblique angle to the vertical axis of said mold, and having a continuously widening cross section moving from the tope to the bottom thereof; and
a nozzle mounted in the tope of each of said ducts, directed inwardly and downwardly toward the interior of said charging mold.

12. Apparatus as recited in claim 1, wherein the upper end of said press mold is made from a material that is porous and allows the passage of carbon dioxide gas under pressure therethrough.

* * * * *